United States Patent [19]

Byer et al.

[11] 4,213,060
[45] Jul. 15, 1980

[54] TUNABLE INFRARED SOURCE EMPLOYING RAMAN MIXING

[75] Inventors: Robert L. Byer, Stanford; Richard L. Herbst, Menlo Park, both of Calif.

[73] Assignee: Board of Trustees of Leland Stanford University, Stanford, Calif.

[21] Appl. No.: 768,275

[22] Filed: Feb. 14, 1977

[51] Int. Cl.² .............................................. H03F 7/00
[52] U.S. Cl. ............................................... 307/426
[58] Field of Search ..................................... 307/88.3

[56] References Cited
PUBLICATIONS

Falk et al., "IEEE Journal of Quantum Electronics," Jun. 1969, pp. 356–357.

*Primary Examiner*—Rudolph V. Rolinec
*Assistant Examiner*—Darwin R. Hostetter
*Attorney, Agent, or Firm*—Harry E. Aine; Harvey G. Lowhurst

[57] ABSTRACT

A tunable source of infrared radiation is obtained by irradiating an assemblage of Raman active gaseous atoms or molecules with a high intensity pumping beam of coherent radiation at a pump frequency $\omega_p$ to stimulate the generation of Stokes wave energy at a Stokes frequency $\omega_s$ and to stimulate the Raman resonant mode at the Raman mode frequency $\omega_R$ within the irradiated assemblage where the pump frequency $\omega_p$ minus the Stokes frequency $\omega_s$ is equal to the Raman mode frequency $\omega_R$. The stimulated assemblage is irradiated with a tunable source of coherent radiation at a frequency $\omega_i$ to generate the output infrared radiation of the frequency $\omega_0$ which is related to the Raman mode frequency $\omega_R$ and the input wave $\omega_i$ by the relation $\omega_0 = \omega_i \pm \omega_R$. In one embodiment the interaction between the pump wave energy $\omega_p$ and the tunable input wave energy $\omega_i$ is collinear and the ratio of the phase velocity mismatch factor $\Delta k$ to the electric field exponential gain coefficient T is within the range of 0.1 to 5. In another embodiment the pump wave energy $\omega_p$ and the tunable input wave energy $\omega_i$ have velocity vectors $k_p$ and $k_i$ which cross at an angle to each other to compensate for phase velocity mismatches in the medium. In another embodiment, the Stokes wave energy $\omega_s$ is generated by pump energy $\omega_p$ in a first Raman cell and $\omega_s$, $\omega_i$ and $\omega_p$ are combined in a second Raman mixing cell to produce the output at $\omega_i$.

18 Claims, 7 Drawing Figures

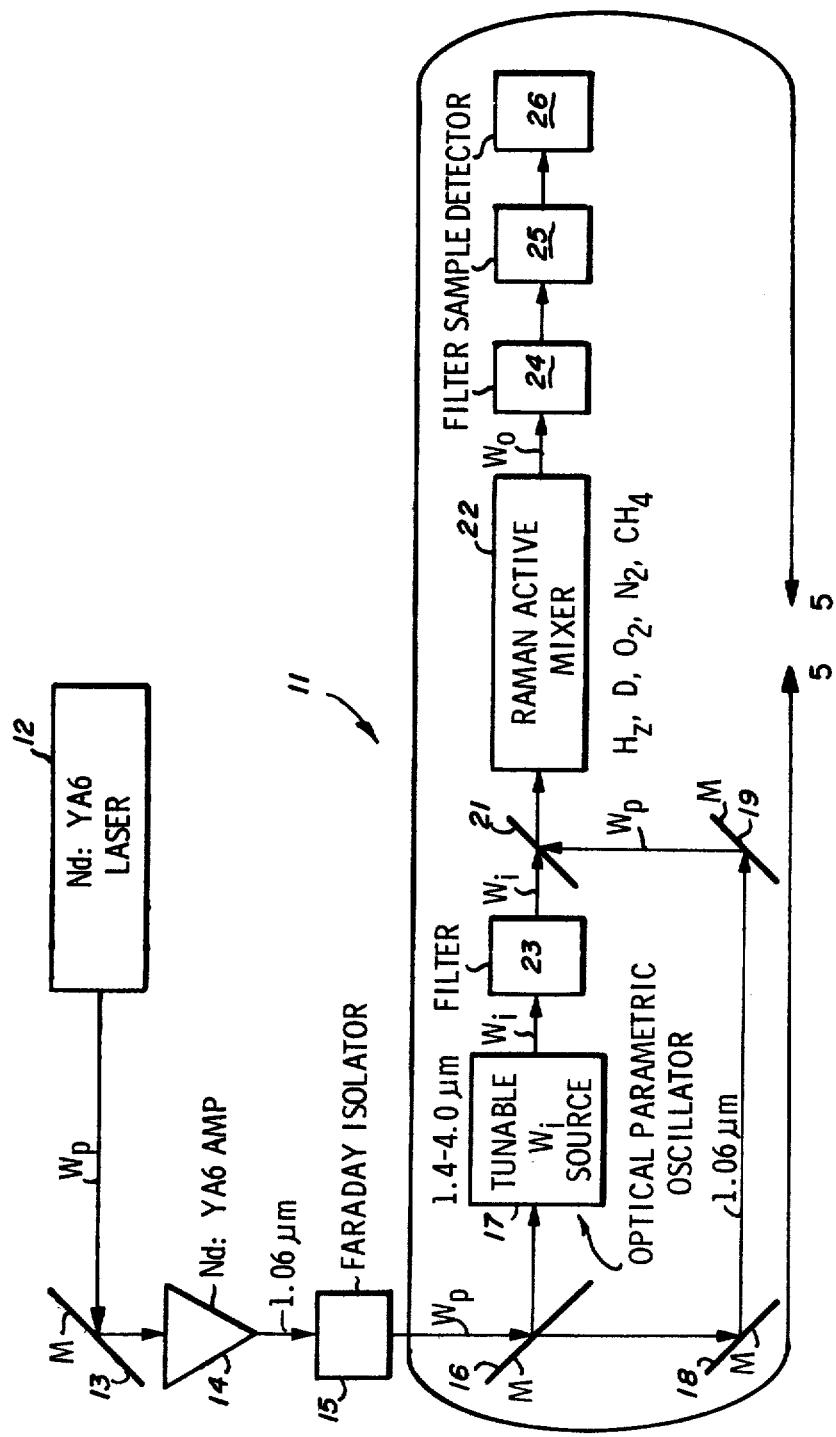
Fig_1

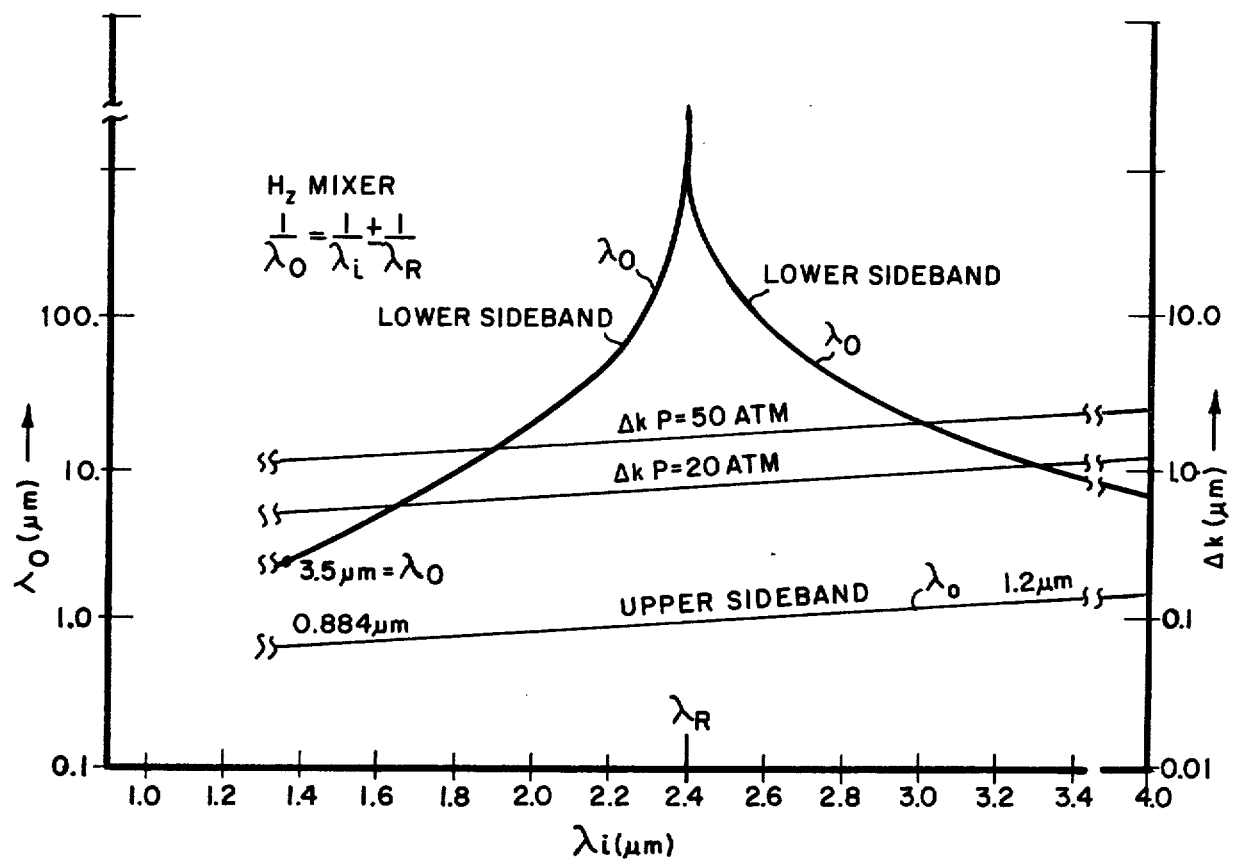
Fig_2

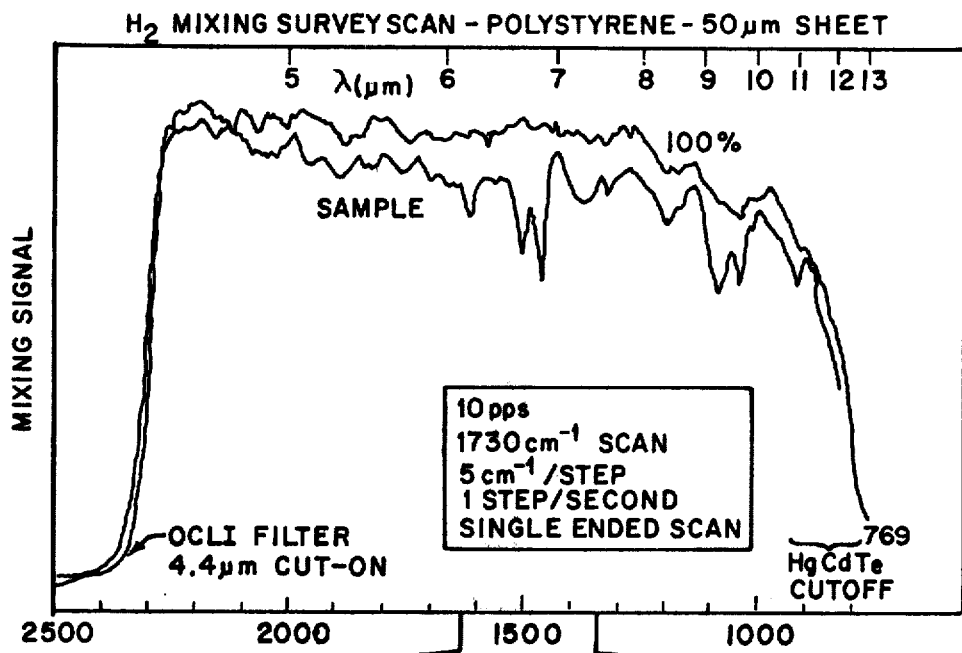
Fig_3
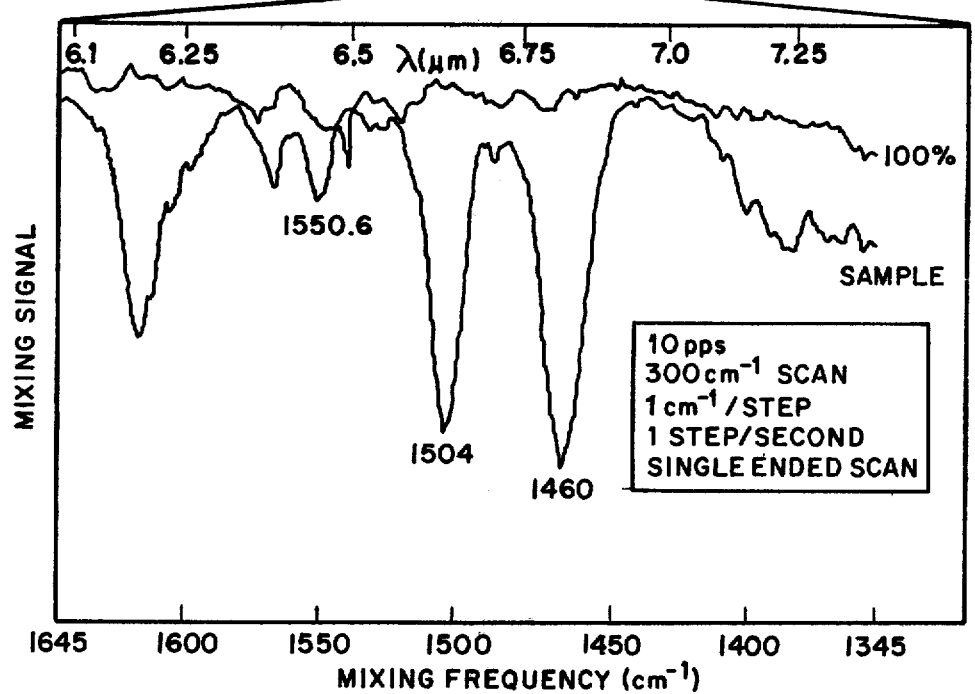
Fig_4

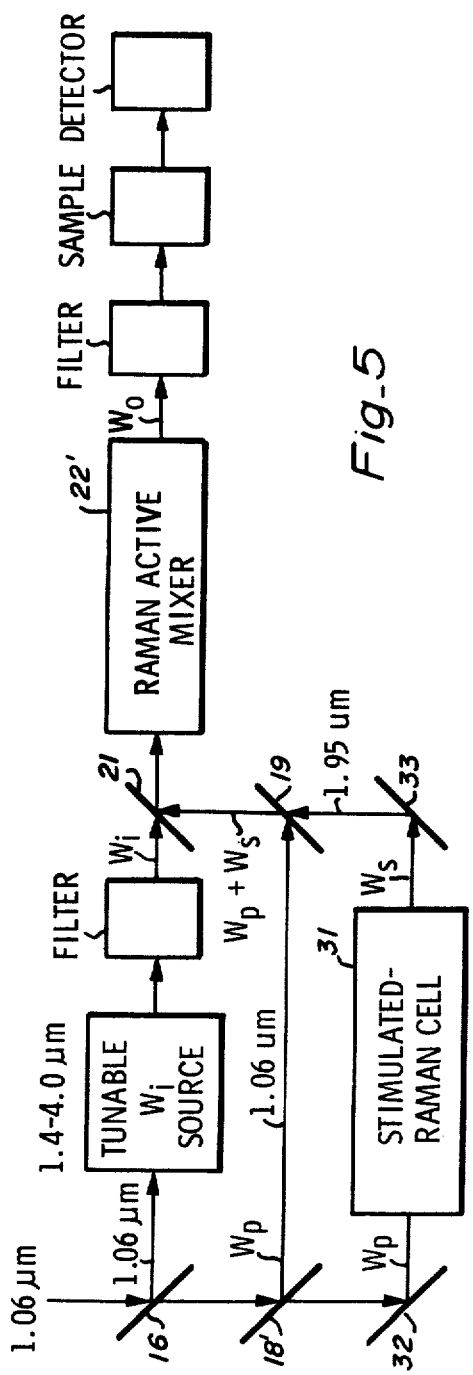
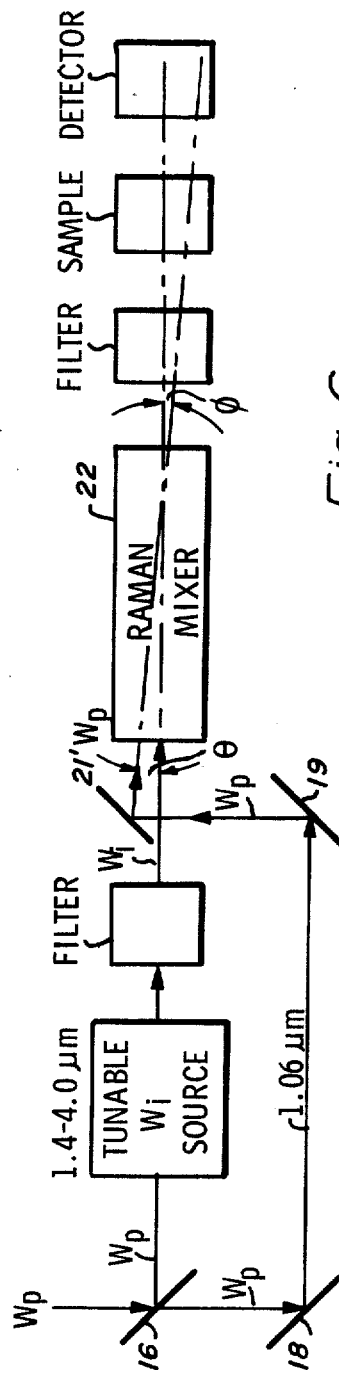
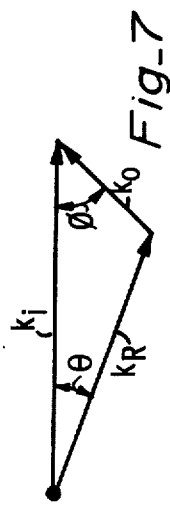

TUNABLE INFRARED SOURCE EMPLOYING RAMAN MIXING

GOVERNMENT SUPPORT

The government has rights in this invention pursuant to contract No. EY-76-S-04-3570 awarded by the U.S. Energy Research Development Administration.

BACKGROUND OF THE INVENTION

The present invention relates in general to a source of coherent infrared radiation and more particularly to such a source which is continuously tunable over a wide band and which employs Raman mixing for generation of the output infrared radiation.

DESCRIPTION OF THE PRIOR ART

Heretofore, it has been proposed to irradiate an assemblage of hydrogen gas at a pressure equal to or greater than ten atmospheres with a high intensity beam of coherent radiation in the infrared band, such as the 1.06 micron wavelength radiation obtained from a Nd:YAG laser, to excite the Raman optical vibrational mode of resonance of the hydrogen gas. A tunable input wave $\omega_i$, such as that obtained from a tunable parametric oscillator in the near infrared was proposed to be injected into the stimulated hydrogen gas to down shift the output energy of the tunable parametric oscillator in the near infrared of 1.5 to 2.2 microns into the far infrared of 4.0 to 27 microns.

The aforedescribed process involves irradiating the hydrogen gas with the high intensity laser pump at $\omega_p$ to generate a Stokes wave at a frequency $\omega_s$ and to excite the Raman resonant mode at a frequency $\omega_R = \omega_p - \omega_s$. The wave vector for the Raman mode $k_R$ of the hydrogen vibration adjusts itself so that perfect phase velocity matching occurs, i.e., $k_R = k_p - k_s$.

However, it was thought by the originator of the aforedescribed prior art proposal that the normal dispersion in the hydrogen gas would result in a mismatch in the wave vectors, thereby deleteriously affecting the conversion process. In other words, $\Delta k$ was not zero in the mixing process where $\Delta k$ is the phase velocity vector mismatch and is defined as $k_i - k_o - k_R$. It was proposed to solve the mismatch problem by the addition of a buffer gas, such as hydrogen chloride or hydrogen fluoride, to the hydrogen gas cell to adjust one or several of the indices of refraction so that $\Delta k = 0$ for the gas mixture. It was thought by the author that for a given hydrogen and buffer gas pressures, perfect phase matching could be obtained at one output wavelength.

The aforedescribed prior art infrared source is disclosed in Progress Report No. 5 for U.S. Army Research Office, Contract DAHC-04-68-C-0048 for the period 1 July 1970 to 31 December 1970, also indentified as Microwave Laboratory Report No. 1918 of the Microwave Laboratory, W. W. Hansen Laboratory of Physics, Stanford University, Stanford, California dated December 1970, see pages 6–14.

A problem with the proposed infrared source, utilizing Raman mixing in hydrogen gas, was the difficulty of employing the buffer gas and attempting to vary the pressure or other parameters of the gas mixture including the buffer gas to obtain phase matching over the desired tunable range of the hydrogen mixer.

Other investigators have reported in the JETP Letters, Vol. 21, No. 4, of February 20, 1975, pages 105–107 in an article titled "Influence of Parametric Processes on the Generation of Stokes Components of Stimulated Raman Scattering Under Biharmonic Pumping" that Raman mixing in hydrogen gas of input radiation in the visible, i.e., at wavelengths shorter than the infrared, can be down converted to output wave energy at longer wavelengths but still in the visible range, where the mixing chamber has a length longer than the linear synchronism length, i.e., where there is substantial phase velocity mismatching of the wave vectors within the active medium of the Raman mixer. This article also contains some speculation that new frequency-tunable IR sources can be obtained in systems with invariant beam geometry due to lower sensitivity to the satisfaction of the wave synchronism conditions.

SUMMARY OF THE PRESENT INVENTION

The principle object of the present invention is the provision of an improved tunable infrared source employing Raman mixing.

In one feature of the present invention, a Raman active gaseous medium is pumped by means of a laser beam of infrared radiation to generate Stokes waves and to stimulate the Raman mode frequency. The stimulated Raman medium is further irradiated by coherent radiation of an input frequency to generate output radiation in the infrared band. The conditions of the Raman medium and its excitation are arranged such that the ratio of the phase velocity mismatch factor $\Delta k$ to the electric field exponential gain coefficient T is in the range of 0.1 to 5, whereby relatively efficient conversion of the input radiation to a tunable infrared output wave is obtained without phase matching the various wave vectors within the Raman active gaseous medium.

In another feature of the present invention, the Raman active gaseous medium comprises an assemblage of gaseous molecules selected from the group consisting of hydrogen, nitrogen, oxygen, deuterium, and methane.

In another feature of the present invention, the tunable input wave energy $\omega_i$ is obtained by an optical parametric oscillator driven from a portion of the pump energy to derive the tunable infrared wave energy $\omega_i$ for irradiation of the stimulated gaseous Raman active medium.

In another feature of the present invention, the excited active gaseous medium of the Raman mixer is free of buffer gas constituents for phase velocity matching the various interacting wave vectors within the stimulated gaseous medium of the Raman mixer, whereby the mixer is substantially simplified.

In another feature of the present invention, the pump wave and the input wave have their wave vectors crossing within the stimulated Raman active medium at an angle so as to compensate for wave vector phase velocity mismatches within the gaseous medium.

In another feature of the present invention, a first Raman active medium is pumped by an intense pump wave at $\omega_p$ to generate an output Stokes wave at $\omega_s$ which is combined in a second Raman cell with the input wave at $\omega_i$ and the pump wave at $\omega_p$ to generate the output wave at $\omega_o$; whereby improved control over the mixing is obtained.

Other features and advantages of the present invention will become apparent upon a perusal of the following specification taken in connection with the accompanying drawings wherein:

BRIEF DESCRIPTION OF THE DRAWINGS

FIG. 1 is a schematic diagram, in block diagram form, of an infrared spectrometer employing features of the present invention;

FIG. 2 is a plot of output wavelength in microns and phase mismatch factor $\Delta k$ as a function of the wavelength of the tunable input energy in microns;

FIG. 3 is a plot of output beam intensity versus wavelength with and without the absorption of a polystyrene sample;

FIG. 4 is an expanded portion of the plot of FIG. 3 showing a higher resolution absorption spectrum of the sample from the output beam in wavelengths between 6.1 and 7.3 microns.

FIG. 5 is a detail view of a portion of the apparatus of FIG. 1 depicting an alternative embodiment of the present invention;

FIG. 6 is a view similar to that of FIG. 5 depicting another alternative embodiment of the present invention; and FIG. 7 is a vector diagram depicting the relationship of the input, output and Raman mode waves within the mixing cell of FIG. 6.

DESCRIPTION OF THE PREFERRED EMBODIMENTS

Referring now to FIG. 1 there is shown an infrared tunable spectrometer 11 incorporating features of the present invention. A Nd:YAG laser 12, preferably operating with an unstable resonator such as that disclosed in copending U.S. application Ser. No. 752,110 filed 20 December 1976 and also commercially available from Quanta-Ray, Inc. of Mountain View, Calif., delivers an output beam of coherent radiation at an infrared wavelength of 1.06 microns. The output laser beam is reflected from a first mirror 13 through a Nd:YAG amplifier 14 to provide up to 500 mJ of 1.06 micron radiation in a ten nanosecond pulse at ten Hertz repetition rate prior to passage through a Faraday isolator 15 and thence to a fifty percent beam splitting mirror 16.

Half of the 1.06 micron radiation is used to pump a LiNbO$_3$ double pass singly resonant parametric oscillator serving as a tunable source 17 of infrared radiation in the band of 1.4 to 4.0 microns. Such a parametric oscillator tunable source 17 is disclosed in an article titled "Parametric Oscillators" published in *Tunable Lasers and Applications*, edited by A. Moradian et. al, published in Berlin in 1976 at page 70. The other half of the 1.06 micron radiation is reflected via a series of mirrors 18, 19 and 21 into a Raman active mixer 22 preferably containing hydrogen gas at a pressure between four and 30 atmospheres. In a typical example, the Raman active mixer 22 has a length as of one meter.

A filter 23 is provided at the output of the tunable source 17 for rejecting the pump energy at 1.06 microns and for passing the tunable source frequencies of 1.4 to 4 microns into the Raman active mixer. In the Raman active mixer 22 the pump and input waves travel collinearly to produce output wave energy at a frequency $\omega_o$.

More particularly with regard to the action of the Raman active mixer, the pump energy $\omega_p$ at 1.06 microns, upon obtaining a certain threshold intensity $I_p$, as of greater than 200 megawatts ($\lambda^2$ microns) per square centimeter, excites a Stokes wave of a frequency $\omega_s$ which in turn excites the Raman resonance mode at a frequency $\omega_R$ of the Raman active gaseous medium. The excited Raman mode serves as a local oscillator at $\omega_R$ for producing an upper and/or lower side band output wave of a frequency $\omega_o$ in accordance with the equation: $\omega_o = \omega_i \pm \omega_R$.

The output wave energy $\omega_o$ from the Raman active mixer 22 is fed through a filter 24 for filtering out the pump wavelength $\lambda_p$ and the input wavelength $\lambda_i$ and for passing the output frequency $\omega_o$. A sample of matter 25 to be examined, such as a 50 micron thick sheet of polystyrene, is placed in the output beam path and the absorption of energy by the sample 25 from the beam is detected by a detector 26. A plot of the detected beam intensity as a function of the wavelength of the output energy $\omega_o$, with and without the sample, is plotted in FIG. 3 and it is seen that substantial absorption peaks occur in the range between six and ten microns with relatively large peaks occurring at approximately 6.8, 6.7 and 6.2 microns. A higher resolution scan of the spectrum between 6.1 and 7.25 microns is shown in FIG. 4.

Another embodiment of the invention is shown in FIG. 5 and consists of the addition of a first stimulated Raman cell 31 pumped by a portion of the pump beam at $\omega_p$ as fed through a second beam splitting mirror 18' and mirror 32 into the cell 31. In this embodiment the 1.06 microns pump radiation at $\omega_p$ pumps the first Raman cell 31 to generate the Stokes wave at $\omega_s = 1.95$ microns by stimulated emission. This Stokes wave at $\omega_s$ is derived as an output beam and fed via mirrors 33, 19' and 21 into a second Raman mixing cell 22'. The tunable input wave at $\omega_i$, generated Stokes wave at $\omega_s$ and pump field at $\omega_p$ are then mixed in the second lower pressure shorter Raman mixing cell 22' to generate the output wave at $\omega_o$. This arrangement allows for optimization of the mixing conditions in the second cell by injecting optimum powers of $\omega_p$, $\omega_s$ and $\omega_i$ to generate $\omega_o$. The second cell 22' may be operated at lower pressure to set $\Delta k << \Gamma$ since it is not required to also generate the Stokes field $\omega_s$ which requires higher pressures in general, as in the embodiment of FIG. 1.

Another alternative embodiment of the present invention is shown in FIG. 6. The positive dispersion of hydrogen gas leads to the possibility of angle phase-matching in the hydrogen mixer 22. The pump input mirror 21' to the mixer 22 is arranged to reflect the pump beam of frequency $\omega_p$ at an angle $\theta$ to the tunable input beam at frequency $\omega_i$ so that the $\omega_p$ and $\omega_i$ beams cross within the mixing cell 22. The wave vector diagram for the crossed beam embodiment is as shown in FIG. 7 where $k_R = k_p - k_s$. The angles $\theta$ and $\phi$ are related by a small angle approximation $k_{in}\theta \simeq k_{out} \phi$. For example, at 20 atmospheres hydrogen pressure for 1.06 microns pump wavelength $\lambda_p$ and 1.95 microns tunable input wavelength $\lambda_i$ which generates 10.277 microns output wavelength $\lambda_o$ $$\theta = 3.26 \times 10^3 \text{ rad}$$

$$\phi = 1.72 \times 10^2 \text{ —rad}$$

The output infrared beam at $\lambda_o$ is therefore easily separated from the pump and input beams by blocking off the pump and input beams at the output of the mixing cell 22. This is an advantage over the embodiments of FIGS. 1 and 5.

The interaction length $l_{int}$ is to first order given by:

$$l_{int} = \sqrt{\pi} W/\theta$$

where W is the beam radius at the crossing point in the medium.

In a typical example, W=0.15 cm so that with $\theta = 3.26 \times 10^{-3}$ rad:

$$l_{int} = 81 \text{ cm}$$

which is much longer than the inverse gain length $l_\Gamma = 1/\Gamma$ and much longer than the phase mismatch length $l_{\Delta k} = 1/\Delta k$. Therefore, for reasonable stop sizes such that $l_{int} > l_\Gamma$. Raman mixing in hydrogen is improved by angle matching using crossed beams.

The advantage of coherent Raman mixing in hydrogen which is plotted in FIG. 2 is that it does not require a resonator, is not limited in tuning range by resonance and does not require phase velocity matching. The mixer replaces the high peak power tunable source by a fixed frequency pump source 12. The generated output linewidth is determined by the pump, tunable input and Stokes linewidth which may be a minimum of 285 megahertz for hydrogen superfluorescent operation or even single axial mode for resonated Stokes operation.

Frequency conversion by coherent Raman mixing involves four radiation fields; the pump $E_p$, generated Stokes $E_s$, tunable input $E_i$ and generated output $E_o$ related by $\omega_p - \omega_s = \omega_i - \omega_o$ where $\omega_p - \omega_s = \omega_R$ is the Raman mode frequency. The coherent mixing process requires the generation of a Stokes field by stimulated Raman scattering and is, therefore, different from the parametric four wave mixing process which does not involve a population change.

For interacting plane waves the conversion efficiency for the coherent mixing process at perfect phasematching is given by $$\eta = \frac{I_o}{I_i} = \frac{I_s}{I_p} \left( \frac{\omega_0}{\omega_s} \right)^2 \quad \text{(Eq. 1)}$$

where I's are the intensities and $I_s/I_p$ is the conversion efficiency to the first Stokes by the fixed frequency pump laser.

The coherent mixing process does require phasematching to achieve the optimum conversion efficiency. However, we have discovered that when the electric field exponential gain coefficient $$\Gamma_p = \frac{\omega_s}{2 n_s c} \chi_R'' |E_p|^2 \quad \text{(Eq. 2)}$$

is large compared to the phase mismatch factor $$\Delta k = (k_p - k_s) + (k_i - k_o) \quad \text{(Eq. 3)}$$

the conversion efficiency is approximately $$\frac{I_o}{I_i} = \eta \left[ \frac{1}{1 + \left(\frac{\Delta k}{\Gamma_p}\right)^2} \right] \quad \text{(Eq. 4)}$$

where the assumed electric fields propagate as $E = E_o \cdot e[\Gamma - i\Delta k/2]_z$, $n_s$ is the index of refraction and $\chi_R''$ is the on-resonance Raman susceptibility. For a low dispersive medium such as hydrogen gas, the ratio $\Delta k/\Gamma_p$ can be less than unity and the addition of buffer gas for phasematching is not necessary. In a preferred embodiment without buffer gas operating mismatched, the ratio $\Delta k/\Gamma$ can have values within the range of 0.5 to 5 and still achieve very useful results. When the ratio $\Delta k/\Gamma$ exceeds five undesired $\sin^2 (\Delta k L/2)$ modulation of the output power is obtained as a function of output wavelength. This is disadvantageous for many applications and is to be avoided if possible. Operating in the desired range of $\Delta k/\Gamma$ of 0.1 to 5 corresponds to a situation in which the gain is so high that the conversion efficiency takes place in a distance short compared to the coherence length.

As an example, consider hydrogen gas at 20 atmospheres pumped by a Q-switch Nd:YAG laser at 1.06 microns. In this case $\Gamma_p/I_p = 4 \times 10^{-3}$ cm/MW so that at an input intensity of 200 MW/cm², $\Gamma_p \sim 0.8$ cm⁻¹. If $\omega_i$ tunes from 4155-7000 cm⁻¹, the tuning range of a 1.06 micron pumped LiNbO₃ parametric oscillator, the generated output frequency tunes from 0-2845 cm⁻¹ and $\Delta k = 0.4$–0.6 cm⁻¹ as shown in FIG. 2. Thus $\Delta k/\Gamma_p \sim 0.5$–0.75 and the lack of phasematching results in, at most, a fifty percent conversion efficiency reduction according to Eq. 4. Since $\Delta k$ is relatively constant over a wide range of generated frequencies, deviation from exact phasematching is not a problem in coherent Raman mixing in hydrogen.

In a specific example of the spectrometer apparatus of FIG. 1, an unstable resonator Nd:YAG source 12 has its output amplified to provide up to 500 mJ of 1.06 microns radiation in a ten nsec pulse at 10 Hz repetition rate prior to the fifty percent beamsplitter 16. Half of the 1.06 micron radiation is used to pump the LiNbO₃ double pass singly resonant parametric oscillator tunable source 17 and the rest of the beam at $\omega_p$ is reflected into the hydrogen cell to generate stimulated Raman scattering. A 2:1 beam reducing telescope is used prior to the hydrogen cell 22 to set the threshold at 50 mJ for an incident 3 mm diameter near field unstable resonator beam. The hydrogen cell 22 is operated single pass in a superfluorescent mode at 20 atmospheres pressure. At two times above threshold the measured energy conversion efficiency to the first Stokes wave $\omega_s$ at 1.9 microns is 22% which corresponds to a photon efficiency of greater than 40%. At higher pumping intensities the conversion to the first Stokes field decreases as expected as power is transferred to the second Stokes and anti-Stokes fields.

The hydrogen cell 22 was set up with a fused silica input window and a negative lens CaF₂ output window. The CaF₂ lens diverged the transmitted 1.06 micron pump beam prior to a high reflection coated ZnSe window which was used to selectively transmit the generated infrared output signal $\omega_o$. An InSb or HgCdTe detector 26 was used to detect the signal after an InAs filter 24.

At 100 mJ incident energy at $\omega_p$, the LiNbO₂ parametric tuner generated 10 mJ in the signal wave $\omega_i$ tunable from 1.4–2.12 microns. Other suitable optical parametric oscillator media include KD*P and LiIO₃. The output from the LiNbO₃ tuner is frequency controlled with an internal grating to a 5 cm⁻¹ band-width and is incident into the hydrogen cell 22 as a 3 mrad divergent beam without focusing. At the end of the one meter hydrogen cell, where the mixing takes place, the parametric oscillator beam diameter was measured to be 1 cm and thus is much larger than the 3 mm diameter 1.06 micron pump beam $\omega_p$.

The measured output energy $\omega_o$ using a pyroelectric joule meter at 5 microns wavelength, was 3 microjoule for a peak power of 6 kW in a 5 nsec pulse. This output power is approximately a factor of 40 below the theoretical value. Most of the conversion efficiency reduction can be accounted for by the 1.06 micron to LiNbO$_3$ parametric oscillator beam area overlap factor of $\sim 0.09$. The conversion efficiency can be improved by proper focusing within the cell 22.

In a second embodiment a KD*P crystal is employed at the output of the Faraday isolator 15 to generate pump energy $\omega_p$ at 0.532 micron which generated stimulated Raman scattering in the hydrogen cell 22. The 0.532 micron beam and the input tunable beam were crossed at an angle $\theta$ in the hydrogen cell. The generated infrared output was detected at an angle $\phi$ as shown in FIGS. 6 and 7. In this arrangement, the beams were crossed to achieve perfect phasematching $\Delta k = 0$ and to allow the infrared beam to be separated from the input beams. The 0.532 micron pump wave was used in place of the 1.06 micron radiation to avoid interference from the second Stokes wave at 9.0 microns. In this way a 4.4 micron cut-on band pass filter 24 is used to eliminate the incident pump $\omega_p$ and parametric oscillator fields $\omega_s$ and $\omega_R$ and to pass only the generated output wave $\omega_o$ out to the 20 micron limit imposed by our output KCl window on cell 22.

Using the computer controlled LiNbO$_3$ parametric tuner followed by the hydrogen mixer we generated the polystyrene survey scan shown in FIGS. 3 and 4. The spectrum was taken single ended with a HgCdTe detector 26 that had a wavelength response limit of 13 microns. The 4.4–13 micron survey scan was taken at 5 cm$^{-1}$/step, 1 step per second at a 10 pps laser repetition rate. FIG. 4 shows a separate scan over a 300 cm$^{-1}$ range centered near 1500 cm$^{-1}$. Here the scan rate was 1 cm$^{-1}$/step at 1 step per second. The resolution was limited by the LiNbO$_3$ tuner 17 linewidth of 4 cm$^{-1}$. However, operation of the LiNbO$_3$ tuner 17 at a 0.1 cm$^{-1}$ resolution is readily achieved with the insertion of a line narrowing tilted etalon between the source 17 and filter 23. The spectra of FIGS. 3 and 4 illustrates the potential for the generation of continuously tunable infrared radiation over a very wide infrared spectral range by the LiNbO$_3$ parametric tuner—hydrogen mixer combination.

Coherent Raman mixing in hydrogen provides a unique method of generating widely tunable coherent radiation without the limitations inherent in nonlinear crystals of phasematching, damage and limited transparency range. It also conveniently separates the high intensity source 12 required for stimulated Raman scattering, from the input tunable source 17. Finally, coherent mixing in hydrogen is scalable to high input intensities and energies limited only by dielectric breakdown and cell size. It should prove to be a useful mixer for frequency extension of a variety of tunable input sources. What is claimed is:

1. In a method for generation of coherent infrared radiation the steps of:
   irradiating a medium of Raman active gaseous atoms or molecules with coherent radiation of a pump frequency $\omega_p$ to excite the resonant Raman mode at the frequency $\omega_R$ within the irradiated medium where the pump frequency $\omega_p$ minus the Stokes frequency $\omega_s$ is equal to the Raman mode frequency $\omega_R$;
   irradiating the resonant Raman active medium with radiation of an input frequency $\omega_i$ to generate output radiation of an output frequency $\omega_o$ related to the Raman mode frequency $\omega_R$ and to the input wave energy frequency $\omega_i$ by the relation $\omega_o = \omega_i \pm \omega_R$; and
   wherein the ratio of the phase velocity mismatch $\Delta k$ of the medium to the electric field exponential gain coefficient $\Gamma$ within the medium is in the range of 0.1 to 5, where $\Delta k = -(k_p - k_s) + (k_i - k_o)$ where k is the respective wave vector which is the equal to $(2\pi n/\lambda)$ where $\lambda$ is the respective wavelength and n is index of refraction of the medium and where $\Gamma = \omega_s/2n_s c \cdot X''_R |E_p|^2$, where $n_s$ is the index of refraction of the medium, $X''_R$ is the on-resonance Raman susceptibility of the medium, c is the velocity of light, and $E_p$ is the intensity of the pump electric field within the medium.

2. The method of claim 1 including the step of changing the frequency $\omega_i$ of the input wave energy to change the output frequency $\omega_o$.

3. The method of claim 2 wherein the output wave energy has a frequency $\omega_o = \omega_i - \omega_R$.

4. The method of claim 1 wherein the gaseous molecules of the medium are selected from the group consisting of hydrogen, nitrogen, oxygen, deuterium and methane.

5. The method of claim 1 wherein the gaseous medium comprises hydrogen molecules.

6. The method of claim 1 wherein the step of irradiating the stimulated medium with radiation at the input frequency $\omega_i$ includes the step of irradiating an optical parametric oscillator medium with radiation at the pump frequency or harmonic thereof to generate the input wave energy and directing the generated input wave energy into the resonant Raman medium.

7. The method of claim 6 wherein the optical parametric oscillator medium is selected from the group consisting of LiNbO$_3$, KD*P and LiIO$_3$.

8. The method of claim 6 including the step of tuning the frequency $\omega_i$ of the generated input radiation to produce a resultant tuning in the output frequency $\omega_o$.

9. In a method for generating coherent infrared radiation the steps of:
   irradiating a first medium of Raman active material with coherent radiation at a pump frequency $\omega_p$ and of sufficient intensity $I_p$ to stimulate the generation of Stokes wave energy within the irradiated medium of a frequency $\omega_p$ minus the Stokes frequency $\omega_s$ is equal to the Raman mode frequency $\omega_R$; and
   irradiating a second medium of Raman active material with
   radiation of an input frequency $\omega_i$ and with the Stokes wave energy of the frequency $\omega_s$ as derived from the first medium to generate output radiation of an output frequency $\omega_o$ related in the second medium to the Raman mode frequency $\omega_R$ in the second medium by the relation $\omega_o = \omega_i \pm \omega_R$.

10. The method of claim 9 including the steps of changing the frequency $\omega_i$ of the input wave energy to change the output frequency.

11. In an apparatus for generating coherent infrared radiation:
   means for irradiating a medium of Raman active gaseous atoms or molecules with coherent radiation of a pump frequency $\omega_p$ to excite the resonant Raman mode at the frequency $\omega_R$ within the irradiated medium where the pump frequency $\omega_p$ minus the Stokes frequency $\omega_s$ is equal to the Raman mode frequency $\omega_R$;

means for irradiating the resonant Raman active medium with radiation of an input frequency $\omega_i$ to generate output radiation of an output frequency $\omega_o$ related to the Raman mode frequency $\omega_R$ and to the input wave energy frequency $\omega_i$ by the relation $\omega_o = \omega_i \pm \omega_R$; and wherein the ratio of the phase velocity mismatch vector $\Delta k$ of the medium to the electric field exponential gain coefficient $\Gamma$ within the medium is in the range of 0.1 to 5, where $\Delta k = -(k_p - k_s) + (k_i - k_o)$ where k is the respective wave vector which is equal to $2\pi n/\lambda n$ where $\lambda$ is the respective wavelength and n is the index of refraction of the medium and where $\Gamma$ equals $$\omega_s/2n_s c \cdot X_R'' |E_p|^2$$

where $n_s$ is the index of refraction of the medium, $X_R''$ is the on-resonance Raman susceptibility of the medium, c is the velocity of light, and $E_p$ is the intensity of the pump electric field within the medium.

12. The apparatus of claim 11 including means for changing the frequency $\omega_i$ of the input wave energy to change the output frequency $\omega_o$.

13. The apparatus of claim 11 wherein the gaseous molecules of the medium are selected from the group consisting of hydrogen, nitrogen, oxygen, deuterium and methane.

14. The apparatus of claim 11 wherein the gaseous medium comprises hydrogen molecules.

15. The apparatus of claim 11 wherein the means for irradiating the stimulated medium with radiation at the input frequency $\omega_i$ includes, means for irradiating an optical parametric oscillator medium with radiation at the pump frequency $\omega_p$ or harmonics thereof to generate the input wave energy $\omega_i$, and means for directing the generated input wave energy $\omega_i$ into the resonant Raman medium.

16. The apparatus of claim 15 wherein said optical parametric oscillator medium is selected from the group consisting of $LiNbO_3$, $KD^*P$ and $LiIO_3$.

17. In an apparatus for generating coherent infrared radiation:

means for irradiating a first medium of Raman active material with coherent radiation at a pump frequency $\omega_p$ and of sufficient intensity $I_p$ to stimulate the generation of Stokes wave energy within the irradiated medium of a frequency $\omega_s$ and to excite resonance of the Raman mode at a frequency $\omega_R$ where the pump frequency $\omega_p$ minus the Stokes frequency $\omega_s$ is equal to the Raman mode frequency $\omega_R$; and means for irradiating a second medium of Raman active material with radiation of an input frequency $\omega_i$ and with the Stokes wave energy of the frequency $\omega_s$ as derived from said first medium to generate output radiation of an output frequency $\omega_O$ related to the Raman mode frequency $\omega_R$ in the second medium by the relation $\omega_O = \omega_i \pm \omega_R$.

18. The apparatus of claim 17 including means for changing the frequency $\omega_i$ of the input wave energy to change the output frequency $\omega_O$.

* * * * *